United States Patent

[11] 3,600,042

| [72] | Inventor | Maxwell L. Cripe |
| | | South Bend, Ind. |
| [21] | Appl. No. | 828,796 |
| [22] | Filed | Dec. 27, 1968 |
| [45] | Patented | Aug. 17, 1971 |
| [73] | Assignee | The Bendix Corporation |

[54] BRAKE SYSTEM CONTROL MEANS
4 Claims, 3 Drawing Figs.

[52] U.S. Cl. ..................................... 303/21 F,
188/181 A, 303/6, 303/24 A
[51] Int. Cl. ..................................... B60t 8/14,
B60t 13/60
[50] Field of Search ........................... 303/21, 24,
6, 6 C, 68—69, 61—63, 80; 188/181

[56] References Cited
UNITED STATES PATENTS
3,232,676  2/1966  Cripe ........................... 303/21

| 3,256,046 | 6/1966 | Cripe .................. | 303/21 |
| 3,325,226 | 6/1967 | Perrino ................ | 303/21 |
| 3,401,986 | 9/1968 | Walker et al. ......... | 303/21 |
| 3,415,578 | 12/1968 | Walker ................. | 303/21 |
| 3,481,653 | 12/1969 | Grancon ............... | 303/21 |

Primary Examiner—Milton Buchler
Assistant Examiner—John J. McLaughlin
Attorney—Richard G. Geib ABSTRACT: A relay control valve operatable by a control pressure to monitor a slave servomotor which valve has additive pressure responsive elements adapted to be effective at progressively different values of the control pressure whereby the ratio of the control pressure for the valve with respect to a control pressure from the valve to the slave servomotor is variable. In addition, the valve can be linked with an antiskid control system to maximize effectiveness of the slave servomotor on at least a portion of a vehicle's brake system in which incorporated.

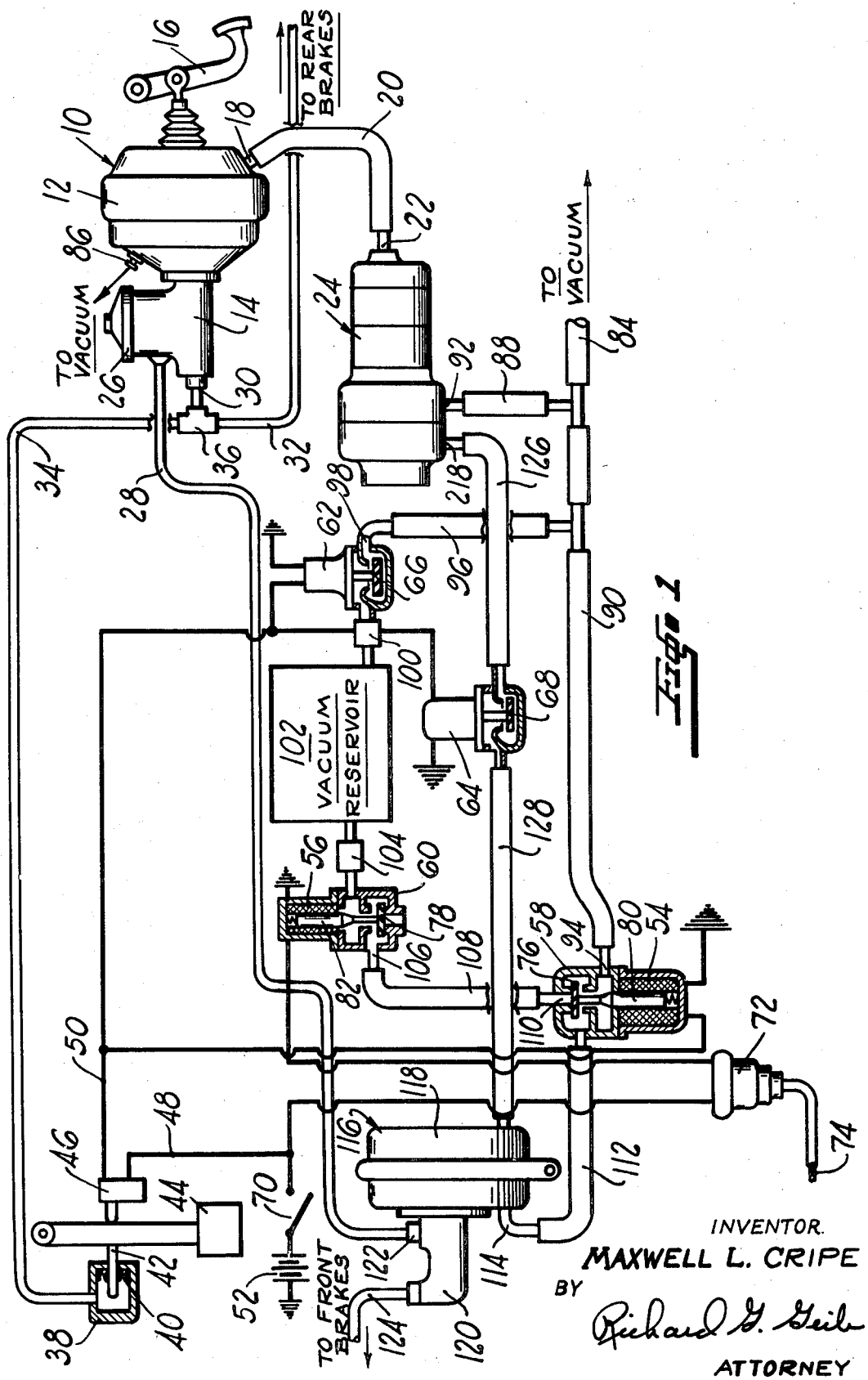

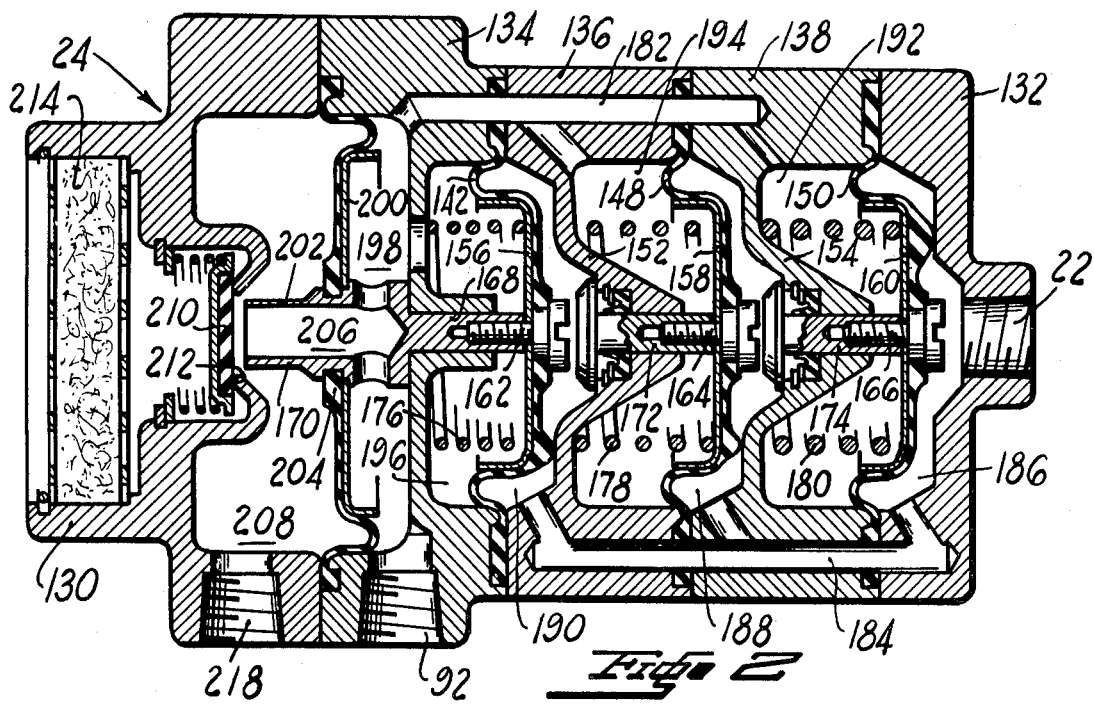
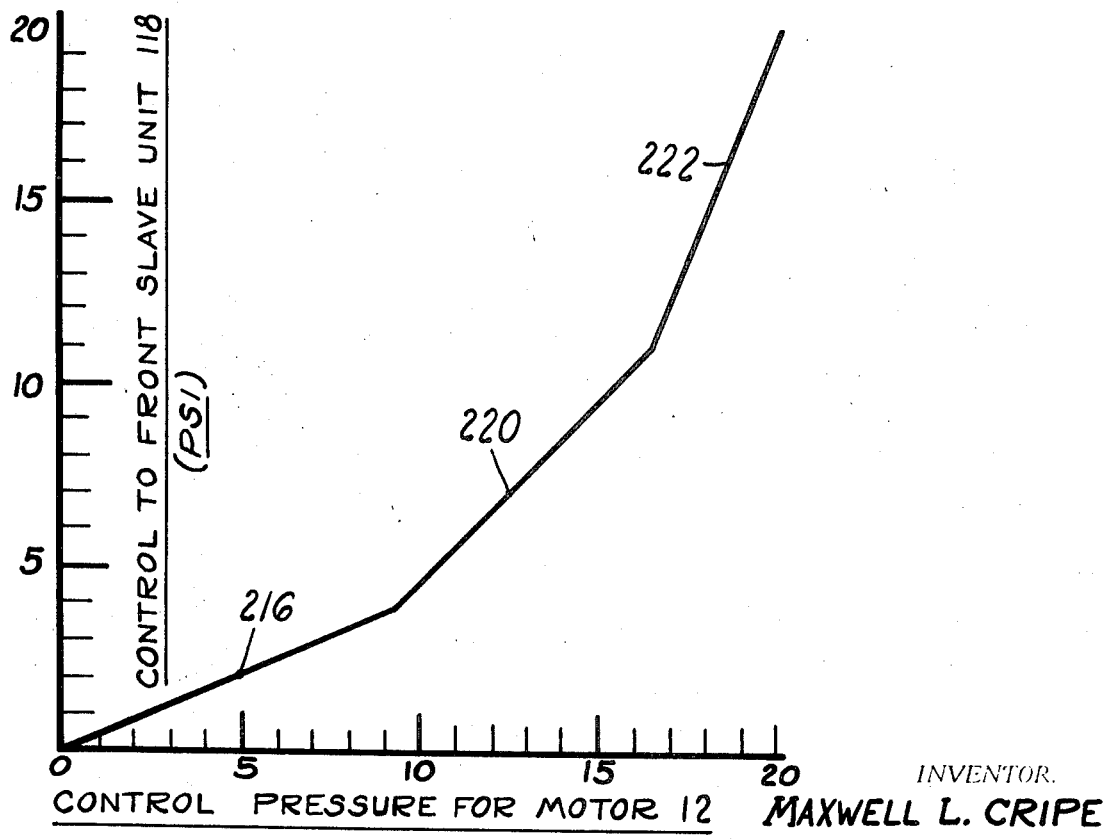

BRAKE SYSTEM CONTROL MEANS

SUMMARY

In recent years is has become increasingly apparent that the prior brake compromise designs can be practically improved to control brake pressure such that it can be available where it can do the most good at the desired pressure for best braking effectiveness.

It is a principal object of this invention to provide a new and improved control means for at least a portion of a brake system whereby power boost for that portion is increased in proportion to another portion controlled by the operator of the vehicle.

A still further object of this invention is to couple a control system, capable of providing informative signals of vehicle mass shifting and wheel deceleration, to the aforesaid control means, if desired, whereby the portion controlled by the means will not overreact in varying road conditions.

DESCRIPTION

Other objects and advantages will appear to those skilled in the art from the following description of the drawings in which:

FIG. 1 is a schematic illustration showing some of the solenoid valves in a power brake system constructed in accordance with this invention in cross section which employs a control valve and an antiskid sensing control system connected together all with the intent of this invention in mind;

FIG. 2 is a cross-sectional view of a control valve between an operator-operated power boost device and a slave servomotor, as seen in FIG. 1; and FIG. 3 is a graphical illustration of the ratio of control pressure for the operator-operated boost unit and the slave servomotor as visualized in connection with this invention.

With regard to FIG. 1, there is shown an operator-operated power brake booster 10 having a vacuum suspended-type motor 12 providing power boost for a master cylinder 14 in accordance with an operator's control of brake pedal 16. A control chamber (not shown) of the motor 12 has an outlet 18 to which is connected a conduit 20 leading to an inlet 22 of a control valve 24 to be explained in greater detail with reference to FIG. 2 hereinafter.

A master cylinder 14 is provided with a reservoir 26 for hydraulic fluid that has an outlet for connection therewith of the conduit 28. Master cylinder 14 has a pressure discharge port 30 to which conduits 32 and 34 are connected by means of a T 36 directly fitted to the port 30 of the master cylinder 14. Conduit 32, as indicated on FIG. 1, is directed to wheel cylinders or disc brake motors for the rear wheel brakes of the vehicle in which the system is to be installed; whereas conduit 34 is communicated to a hydraulic cylinder 38 within which a seal 40 seals plunger 42. A pendulum suspended mass 44 operative by deceleration forces is thus balanced to rear brake pressure such that under normal braking a switch 46 is held open.

The normally open switch 46 is connected by electrical leads 48 and 50 to the vehicle's battery 52 and coils of solenoid valves 58, 62 and 64, such as coil 54, for controlling valve poppets 76, 66 and 68, respectively. It will be seen that upon closing of ignition switch 70, the electrical circuit of the vehicle is complete to the normally open switch 46 via the electrical lead 48.

A conventional governor switch 72, driven by a flexible drive 74 connected to one of the front wheels via gear means (not shown) is placed in an electrical series circuit with coil 56 for the solenoid valve 60. Switch 72 is adjusted to close its contacts whenever the front wheel to which drive 74 is connected approaches a stationary condition, and to open its contacts whenever that front wheel moves at a rate of a few miles per hour, at least. It should be appreciated that two of the switches such as switch 72 may be employed for providing control signal logic for coil 56 from each of the front wheels and independently of the other without departing from the spirit of this invention.

Solenoid valves 60 and 58 have poppets 76 and 78 controlled by positioning of cores 80 and 82 whenever coils 54 and 56 are energized. Similarly the poppets 66 and 68 are controlled by solenoids 62 and 64.

Completing the construction of the power boost vehicle system suggested by this invention, it should be noted that a conduit 84 is connected to the vehicle's engine intake manifold, as is check valve 86 of the motor 12. Conduit 84 is provided with two branches 88 and 90, the former of which connects with inlet 92 of control valve 24 and the latter of which connects with inlet 94 of solenoid valve 58. Branch 90 is further provided with a connection having a conduit 96 leading to an inlet 98 for solenoid valve 62 that is in turn communicated by a conduit 100 to a vacuum reservoir 102 connected by still another conduit 104 to the solenoid valve 60. Solenoid valve 60 has an outlet port 106 connected by a conduit 108 to a port 110 for the solenoid valve 58. Solenoid valve 58 is also connected by a conduit 112 to an inlet 114 for slave servomotor assembly 116 comprising a motor 118 and a slave master cylinder 120. Master cylinder 120 is provided with a fluid inlet 122 to which conduit 28, leading from reservoir 26 of master cylinder 14, is connected, and a pressure discharge port to which a conduit 124 is connected that is communicated to the front brake wheel cylinders or disc brake motors, as may be the case, for the front vehicle wheel brakes. This brake system is completed by attaching conduit 126 from control valve 24 to solenoid valve 64 and conduit 128 from control valve 64 to motor 118.

With reference now to FIG. 2, the control valve 24 is seen in much clearer detail to comprise a five part housing having end sections 130 and 132 with intermediate sections 134, 136 and 138 held together by bolt means with seal means therebetween comprised of peripheral portions of diaphragms 140, 142, 148 and 150. Each of the diaphragms 142, 148 and 150 are provided with raised portions to act as stop means for their normal positions with respect to partitions 152 and 154 as well as the section 132. Also the diaphragms are assembled to support plate structure 156, 158 and 160, respectively, by means of threaded fasteners 162, 164 and 166 that are assembled within tapped holes of a guiding boss 168 for a tubular poppet 170 and a pair of abutment pins 172 and 174, respectively. Springs 176, 178, 180 of progressively greater force are assembled to bias the diaphragms 142, 148 and 150 to their normal position where their raised portions are abutting, as aforementioned, the partitions 152 and 154 as well as end section 132. In this condition, as seen, the abutment pins 172 and 174 are slightly spaced from the heads of the threaded means 162 and 174.

The peripheral portions of diaphragms 142, 148 and 150 are provided with openings that register with passages 182 and 184 in the housing sections 132, 134, 136 and 138. Thus, the inlet port 22 that opens into chamber 186 is communicated to chambers 188 and 190 via the passageway 184; whereas chambers 192, 194, 196 and a chamber 198 to the right, as seen in the drawings, of diaphragms 140 are communicated via passageway 182. Diaphragm 140, by the way, is assembled over a diaphragm support plate 200 fitted within a recess in tubular poppet 202 and has a peripheral bead 204 snap fitted into a deeper groove of the poppet 202. Passageway 206 internally of poppet 202 communicates chamber 198 with a chamber 208 to the left of the diaphragm 140, as seen in FIG. 2, when the valve control means 142, 148 and 150 are in the position shown. A spring biased poppet 210 is normally closed on a seat 212 to normally close an atmospheric air inlet via the filter 214 from the chamber 208 when the elements of the valve 24 are in the position shown.

OPERATION

When the operator of the vehicle desires to brake it, while the engine is operating where the ignition switch 70 is closed to complete the electrical circuit to the governor switch 72, as well as the normally open switch 46 responsive to the pendulum mass 44, he will create a pressure differential in the motor 12 by admitting atmospheric air to one side of a movable wall means therein with vacuum being present on the other side. This atmospheric air will be directed via the outlet 18 and conduit 20 to inlet 22 of valve 24 immediately. Thus, the control pressure for the motor 12 will rise on a ratio to the control pressure of motor 118 shown by line 216 in FIG. 3. This result is achieved in that at first the control pressure from the motor 12 is sufficient only to move the diaphragm 142 against the light spring 176 to cause tubular poppet 202 to abut on spring-biased poppet 210. This means that this control pressure first closes the communication of vacuum via inlet 92 to an outlet 218 to which conduit 126 is connected. This is, of course, assuming that the balance of deceleration forces to rear brake pressure present in cylinder 38 is effective to maintain the pendulum mass 44 in a position whereby switch 46 has not closed so that solenoid valve 64 has not been energized and poppet 68 does not interfere with the communication of conduits 126 and 128. Likewise, this is also assuming that the governor switch 72 has not closed its contacts whereby solenoid valve 60 has been energized to move poppet 76 from the position shown whereby it permits communication of vacuum via branch 90 to conduit 112 and inlet 114 for the motor 118.

When further braking pressure is desired by the operator and he has thereby continued the depression of the brake pedal 16 to schedule greater atmospheric pressure in the motor 12, the diaphragm 148 will be gradually brought into additive pressure control of the poppet 202 whereby the ratio of control pressure for motor 12 with respect to control pressure for slave unit 118 changes to the slope shown by line 220 in FIG. 3. Still further increase in the atmospheric pressure existent in the control chamber of motor 12 will gradually add the effect of diaphragm 150 on the movement of poppet 202 controlling the spring biased poppet 210 whereby the ratio of control pressure from motor 12 to that of control pressure for slave unit 118 will be further changed to the slope of line 222, as seen in FIG. 3.

If at any time during the braking hydraulic pressure in cylinder 38 moves the pendulum mass 44 to close the contacts in switch 46, solenoid valves 58, 62 and 64 will be energized to close poppets 76, 66 and 68 to terminate the direct connection of vacuum to servomotor 118 and reservoir 102, and in the case of valve 64 the supply of control pressure from valve 24 to the motor 118. With this condition present, the pressure from the slave master cylinder 120 is held at the level it was when the solenoid valves 58, 62 and 64 were energized. Thus, the brake system is being told that maximum brake effectiveness between the front and rear brakes for that deceleration has been reached.

Now, if, in addition to the actuation of the switch 46 by movement of plunger 42, the governor switch 72 has been energized by an approaching lock up of the wheel providing a signal via the flexible drive 74, the series circuit to the solenoid valve 60 is completed. Poppet 78 is moved upwardly to close the communication of vacuum reservoir 102 to the motor 118 and open an atmospheric pressure to the vacuum chamber of the slave motor 118. This will cause the motor 118 to act as if the operator wanted to release brake pressure. In other words, as the motor 118 is provided with a return spring within the vacuum chamber of the motor, the introduction of atmosphere to the inlet 114 will cause the slave master cylinder 120 to decrease the pressure for the front wheel brake. When front brake pressure is relieved so that the governor switch 72 reopens to move poppet 78 to close atmospheric inlet and recommunicate vacuum reservoir 102 to the vacuum side of motor 118, brake pressure then is rescheduled.

It will, thus, be appreciated by those skilled in the art that there has been provided a means to first of all increase power boost for the front brakes at an increased rate with respect to the power boost available for the rear brakes and to impress upon this type of control a means to prevent wheel lock or skidding whereby optimum braking has been effectuated.

I claim:

1. In a power brake system having a fluid pressure servomotor means developing separate brake pressures for front and rear brake means of a vehicle, means to control operation of a slave portion of said servomotor means, said control means comprising:
   deceleration sensing means for regulating a first fluid power source for said slave portion; and
   a pressure responsive valve means operatively connecting said first fluid power source and said slave portion;
   said valve means being connected to a second fluid power source and adapted to close communication of said first source and, thereafter, communicating said second source to said slave portion, said valve means being controlled by differences in control pressure of an operator-operated portion of said servomotor means and said first source;
   said valve means including a first and second wall means and a poppet means;
   said first wall means being progressively effected by said differences between said control pressure and said first source;
   said second wall means being exposed on one side to said first source with fluid passage means to the other side of said second wall means normally communicating said first source to a control chamber in said valve means;
   said poppet means being controllable by said second wall means to close said fluid passage to prevent said first source from communicating to said control chamber and, subsequently, communicating said second source to said control chamber which causes a pressure differential across said second wall means, said pressure differential providing a biasing force for said first wall means.

2. The power braking system, as defined in claim 1, wherein said valve means has a plurality of spring biased diaphragms functioning as said first wall means, each spring biased diaphragm being positioned in said valve means by springs having progressively greater force.

3. The power brake system, as defined in claim 1, wherein said first wall means includes a plurality of spring biased diaphragms having progressively greater spring force to vary the rate of actuation of said slave portion.

4. A power brake system comprising:
   master servomotor means for supplying a first brake pressure to a first part of said brake system;
   slave servomotor means for supplying a second brake pressure to a second part of said brake system;
   a source of fluid power for directly operating said master servomotor means and normally operating said slave servomotor means;
   deceleration sensing means for stopping said fluid power source from operating said slave servomotor means upon receiving a predetermined deceleration rate and, subsequently, relieving pressure received from said fluid power source if deceleration continues and tends to cause a skid condition;
   valve means interdisposed between said slave servomotor and said fluid power source for controlling communications of said fluid power source with said slave servomotor, said valve means having a control chamber in communication with said slave servomotor;
   a plurality of spring biased diaphragms located in said control chamber for regulating flow of said fluid power source to said slave servomotor in response to a control pressure received from said master servomotor, each of said plurality of spring biased diaphragms requiring a more intense control pressure before contributing to the flow of said fluid power source, said fluid flow from said control chamber progressively varying in relation to the pressure differential between the control pressure and the fluid pressure source; and
   relief means connected to said valve means for stopping flow from said fluid power source into said control chamber and relieving pressure in said control chamber in response to the operation of said plurality of spring biased diaphragms.